United States Patent
Baroudi et al.

(10) Patent No.: US 10,539,967 B2
(45) Date of Patent: Jan. 21, 2020

(54) GPS-FREE ROBOTS

(71) Applicant: KING FAHD UNIVERSITY OF PETROLEUM AND MINERALS, Dhahran (SA)

(72) Inventors: Uthman Baroudi, Dhahran (SA); Gamal Sallam, Dhahran (SA); Mohammed Al-Shaboti, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 240 days.

(21) Appl. No.: 15/684,373

(22) Filed: Aug. 23, 2017

(65) Prior Publication Data
US 2018/0059685 A1    Mar. 1, 2018

Related U.S. Application Data

(60) Provisional application No. 62/378,480, filed on Aug. 23, 2016.

(51) Int. Cl.
*G05D 1/00* (2006.01)
*G05D 1/02* (2006.01)

(52) U.S. Cl.
CPC ........... *G05D 1/0287* (2013.01); *G05D 1/028* (2013.01)

(58) Field of Classification Search
USPC ......................................................... 701/23
See application file for complete search history.

(56) References Cited

U.S. PATENT DOCUMENTS

| | | | |
|---|---|---|---|
| 8,108,071 B2 | 1/2012 | Lin et al. | |
| 8,112,176 B2 | 2/2012 | Solomon | |
| 8,494,689 B1 | 7/2013 | Ashton | |
| 2004/0199290 A1 | 10/2004 | Stoddard et al. | |
| 2016/0075026 A1 | 3/2016 | Sisbot et al. | |

OTHER PUBLICATIONS

Sallam, G., et al., "COVER: A Cooperative Virtual Force Robot Deployment Technique", IEEE International Conference on Computer and Information Technology; Ubiquitous Computing and Communications; Dependable, Autonomic and Secure Computing; Pervasive Intelligence and Computing, URL: http://ieeexplore.ieee.org/stamp/stamp.jsp?arnumber=7363238, pp. 1308-1315, (Oct. 26-28, 2015).

Zou, Y., et al., "Sensor Deployment and Target Localization Based on Virtual Forces", IEEE, URL: http://ieeexolore.ieee.org/stamp/stamp.jsp?arnumber=1208965 pp. 1293-1303, (Mar. 30-Apr. 3, 2003).

*Primary Examiner* — James M McPherson
(74) *Attorney, Agent, or Firm* — Oblon, McClelland, Maier & Neustadt, L.L.P.

(57) ABSTRACT

A Two-hop Cooperative Virtual Force Robot Deployment (Two-hop COVER) technique is described. An improved Virtual force VF approach considers the mission requirements such as the number of required robots in each locality. The Two-hop COVER expedites the deployment process by establishing a cooperative relation between robots and neighboring landmarks. Two-hop cooperation is utilized as well to reduce the time and distance needed to satisfy mission requirements. In order to reduce randomness and guide remaining robots throughout the area till they find an unsatisfied landmark, each robot utilizes its history to visit only the locations that it has not visited before. Moreover, each robot will communicate with its neighboring robots and landmarks to use their current positions and history to guide its movements.

20 Claims, 16 Drawing Sheets

GPS-FREE ROBOTS

CROSS-REFERENCE TO RELATED APPLICATION

The following application claims the benefit of Provisional Application No. 62/378,480, filed Aug. 23, 2016, which is herein incorporated by reference in its entirety.

BACKGROUND OF THE INVENTION

Field of the Invention

Employing a networked set of robots is an effective way to serve applications in areas where human intervention is impossible or possess risks. In rescue operations, for example, robots can be used to help in discovering bodies under rubbles or even assist the injured. Collaboration among robots is essential in these applications in order to efficiently achieve the allotted goals in a timely manner. Realizing such collaborative operation without a central coordination is a key challenge. Some works have proposed methods for the distribution of robots, but these have tended to suffer from limitations such as evenly spreading the robots regardless of demand, requiring an a priori known distribution of the demand over an area, or requiring central coordination of the robots.

DESCRIPTION OF THE RELATED ART

Blanket coverage refers to spreading robots in a plain. A number of algorithms have been proposed to achieve maximal blanket coverage based on self-spreading. See Y. Zou and K. Chakrabarty, "Sensor Deployment and Target Localization Based on Virtual Forces," INFOCOM 2003. Twenty-Second Annual Joint Conference of the IEEE Computer and Communications. IEEE Societies. Vol. 2. IEEE, 2003; G. Tan, S. A. Jarvis, and A.-M. Kermarrec, "Connectivity-Guaranteed and Obstacle-Adaptive Deployment Schemes for Mobile Sensor Networks," Distributed Computing Systems, 2008. ICDCS '08. The 28th International Conference on, vol. 8, pp. 429-437, 2008; C. Costanzo, V. Loscr'i, E. Natalizio, and T. Razafindralambo, "Nodes self-deployment for coverage maximization in mobile robot networks using an evolving neural network," Computer Communications, vol. 35, no. 9, pp. 1047-1055, 2012; and M. Gupta, C. R. Krishna, I). Prasad, "SEEDS: Scalable Energy Efficient Deployment Scheme for Homogeneous Wireless Sensor Network", In the Proceedings of the International Conference on Issues and Challenges in Intelligent Computing Techniques (ICICT), Ghaziabad, India, February 2014, each incorporated herein by reference in their entirety. Focused coverage is another model that considers point of interest (PoI). See M. Erdelj, T. Razafindralambo, and D. Simplot-Ryl, "Covering Points of Interest with Mobile Sensors", IEEE Transactions on Parallel and Distributed Systems, Vol. 24, No. 1, January 2013; X. Li, H. Frey, N. Santoro, and I. Stojmenovic, "Strictly localized sensor self-deployment for optimal focused coverage," IEEE Transactions on Mobile Computing, vol. 10, no. 11, pp. 1520-1533, 2011; and D. Zorbas and T. Razafindralambo, "Wireless Sensor Network Redeployment under the Target Coverage Constraint," in New Technologies, Mobility and Security (NTMS), 2012 5th International Conference on, 2012, pp. 1-5, each incorporated herein by reference in their entirety. Assuming circular (disc) field of view, nodes should be distributed around the PoI to achieve coverage, i.e., the union of the field of view of all nodes is hole-free.

Virtual force algorithm (VFA) has been used widely to achieve uniform distribution of robots. In Zou et al., the idea of virtual force was, for the first time, used to improve the coverage after a random deployment of mobile sensors. They consider a binary detection model in which a target is detected (not detected) with complete certainty by the sensor if a target is inside (outside) its circle. After the initial random deployment, all sensor nodes are able to communicate with the cluster head. The cluster head is responsible for executing the virtual force algorithm and managing the one-time movement of sensors to the desired locations. This work considers a uniform distribution of the mobile sensor. It is centralized in term of virtual force calculation which is a single point of failure. G. Tan et al developed connectivity-preserved virtual force technique such that the covered area is maximized and the connectivity is guaranteed. The developed technique considers that there is a base-station located near the area of interest and the disconnected nodes move toward it to get connected.

Wand et al. added particle swarm optimization (PSO) to virtual force approach. See X. H. Wei Wang, "Research on Sensor Network Self-deployment with Virtual Attractive and Repulsive Forces," INTERNATIONAL JOURNAL ON Advances in Information Sciences and Service Sciences, vol. 5, no. 6, pp. 1031-1037, March 2013, incorporated herein by reference in its entirety. In the process of self-organized deployment, the nodes do not really move, but cluster-head node calculates the virtual path first and then guides cluster-in nodes to migrate once to save energy. The fitness function of PSO is designed to consider the time cost by self-organized deployment and the coverage rate after deployment. Only a uniform distribution of the mobile sensors is considered in this work and no guidelines on how to choose the virtual force parameters. In order to limit the number of neighboring robots involved in virtual force computation, authors in Yu et al. suggest the use of Delaunay triangulation to do so. See X. Yu, W. Huang, J. Lan, and X. Qian, "A Novel Virtual Force Approach for Node Deployment in Wireless Sensor Network," 2012 IEEE 8th International Conference on Distributed Computing in Sensor Systems, no. 2011, pp. 359-363, May 2012, incorporated herein by reference in its entirety. Robots will only get affected by the attractive force and repulsive force of the nodes that are directly connected to it in the constructed Delaunay triangulation. This approach requires a lot of computation: each node is required to build Delaunay diagram for every iteration of virtual force computations. Giaretto et al. proposed a distributed sensor relocation scheme based on virtual forces, adding the restriction that there are at most only six nodes that can exert forces on the current node. See M. Garetto, M. Gribaudo, C.-f. Chiasserini, and E. Leonardi, "A Distributed Sensor Relocation Scheme for Environmental Control," in 2007 IEEE International Conference on Mobile Adhoc and Sensor Systems, 2007, pp. 1-10, incorporated herein by reference in its entirety. This work handled the problem that arises when nodes are having a high communication range by using the six nodes restrictions.

Ying et al. use virtual force for post-deployment to improve the coverage in wireless sensor network. They assume that static sensor nodes are initially deployed in the monitoring environment randomly, and the nodes communicate with each other to detect the coverage holes. See Y. Zhang and Z. Wei, "On deployment optimization strategy for hybrid wireless sensor networks," The 26th Chinese Control and Decision Conference (2014 CCDC), pp. 1875-

1880, May 2014, incorporated herein by reference in its entirety. The mobile nodes will be used for increasing the coverage. Assuming that coverage holes generate an attractive field on mobile nodes, the mobile nodes compute the virtual force for many rounds until there is no force toward the mobile node or the maximum number of rounds is reached so the mobile nodes stay where it stops at the last round. If a force is exerted toward a mobile robot from multiple directions it will cause the robots to oscillate and trigger a lot of unnecessary movements. The same is performed in with the mobile robots also used particle swarm optimization to reposition themselves to best cover a sensing hole. See J. Roselin and P. Latha, "Energy Balanced Dynamic Deployment Optimization to Enhance Reliable Lifetime of Wireless Sensor Network," International Journal of Engineering and Technology (IJET), vol. 5, no. 4, pp. 3450-3460, 2013, incorporated herein by reference in its entirety. Work in Li et al. considers both obstacles and preferential areas. See S. Li, C. Xu, W. Pan, and Y. Pan, "Sensor deployment optimization for detecting maneuvering targets," 2005 7th International Conference on Information Fusion, p. 7 pp., 2005, incorporated herein by reference in its entirety. The obstacles exert a repulsive force based on a rank given to each obstacle while the preferential areas and target points exert an attractive force based also on a rank given to each preferential point. This work depends on a cluster head to perform all related calculations needed for robot deployment.

One of the most popular techniques to enable robots self-spreading after an ad-hoc random placement in an area is to model them as electromagnetic particles that exert virtual forces where robots repel or attract neighbors based on proximity. Based on the composite force applied by its neighbors, a robot moves to a new location. This process is repeated many times until the network reaches equilibrium status where robots become uniformly distributed in the area. It has the following advantages: a simple communication model (size and type of the packets), enhancement of the initial coverage degree, and the control of the coverage degree by the threshold value, fast convergence, the consideration of obstacles, borders, and coverage holes. Other approaches lie in one of the following classes: computational geometry based, fizzy based, and metaheuristic based. See M. R. Senouci, A. Mellouk, K. Assnoune, and F. Bouhidel, "Movement-assisted Sensor Deployment Algorithms: a Survey and Taxonomy," IEEE Communications Surveys & Tutorials, vol. 17, no 4, pp. 2493-2510, 2015, incorporated herein by reference in its entirety. In the computational geometry based approaches, a geometric computation is used to find out the places that are not covered yet and direct robots in the dense areas to move toward them. See G. Wang, G. Cao, and T. L. Porta, "Movement-assisted sensor deployment," Proceedings—IEEE INFOCOM, vol. 4, no. 6, pp. 2469-2479, 2004; and G. Wang, G. Cao, P. Berman, and T. F. La Porta, "Bidding protocols for deploying mobile sensors," IEEE Transactions on Mobile Computing, vol. 6, no. 5, pp. 515-528, 2007, each incorporated herein by reference in their entirety. Voronoi diagram and Delaunay triangulation are two common approaches in this class. The weaknesses of this approach are: it is a greedy algorithm, and it is ineffective when dealing with large holes. See M. R. Senouci, A. Mellouk, and K. Assnoune, "Localized Movement-Assisted Sensor-Deployment Algorithm for Hole Detection and Healing," IEEE Transactions on Parallel and Distributed Systems, vol. 25, no. 5, pp. 1267-1277, 2014, incorporated herein by reference in its entirety. In the fuzzy based approach, fuzzy logic system is used to control the robot movement. See B. J. Farahani, H. Ghaffarian, and M. Fathy, "A Fuzzy Based Priority Approach in Mobile Sensor Network Coverage," International Journal of Recent Trends in Engineering, vol. 2, no. 1, 2009; and H. Shu and Q. Liang, "Fuzzy Optimization for Distributed Sensor Deployment," Communications Society, pp. 1903-1908, 2005, each incorporated herein by reference in their entirety. The fuzzy system puts several rules based on the Euclidean distance or the number of robots for example. Then the system will provide a new position that each robot should relocate to it. It does not take into account the presence of obstacles. Algorithms belonging to metaheuristic based approach utilize the effectiveness of metaheuristics in order to settle the position, the direction, and the movement speed of a mobile sensor. Ant Colony (AC), and Genetic Algorithms (GA) are examples of such algorithms. See Y, Suen, "A Genetic-Algorithm Based Mobile Sensor Network Deployment Algorithm," Journal of Chemical Information and Modeling, vol. 53, no. 9, pp. 1689-1699, 2013; and X. Yu, "A faster convergence artificial bee colony algorithm in sensor deployment for wireless sensor networks," International Journal of Distributed Sensor Networks, vol. 2013, 2013, each incorporated herein by reference in their entirety. It has a high complexity and the quality of the obtained solutions depend on a large number of parameters (e.g., number of iterations and GA-related parameters).

A scenario is considered where there is a set of landmarks distributed in the area of interest. Each landmark has a demand that needs to be satisfied. A dynamic coverage of each landmark is addressed based on cooperative landmarks and robots. The work in Baroudi et al. addresses this problem, however, it assumes that there is a central gravity point and any landmark with unsatisfied demand will contact this point to get its demand. See U. Baroudi, G. Sallam, M. Al-shaboti, M. Younis, "GPS-Free Robots Deployment Technique for Rescue Operation Based on Landmark's Criticality," International Wireless Communications & Mobile Computing Conference (IWCMC), August, 2015, incorporated herein by reference in its entirety. It also assumes that all landmarks are connected. In a related work, all the previous assumptions are removed by a proposed COVER technique. Disclosed is a technique that is an improvement over COVER in many ways. See G. Sallam, U. Baroudi, "COVER: A Cooperative Virtual Force Robot Deployment Technique," The 14th IEEE International Conference on Ubiquitous Computing and Communications (IUCC 2015), October 2015, incorporated herein by reference in its entirety.

A two-hop communication is used to reduce the deployment time and distance. Two-hop COVER considers a cooperation between landmarks and robots and the demand of each landmark in its procedure. The cooperation is proposed to expedite the procedure and to achieve more demand satisfaction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4(A) illustrates the initial position of the robots and the demand of landmarks. FIG. 4(B) illustrates the final position of the robots and the remaining demand of the landmarks.

FIG. 9(A) illustrates the initial deployment of the robots. FIG. 9(B) illustrates the final deployment according to two-hop COVER. FIG. 9(C) illustrates the start of Trace Fingerprint implementation by robot 14. FIG. 9(D) illustrates Robot 14 moving toward the nearest free area to the right. FIG. 9(E) illustrates Robot 14 moving downward toward the nearest free area and gets in range of the landmark 16. FIG. 9(F) illustrates Robot 14 getting associated.

DETAILED DESCRIPTION OF THE DISCLOSURE

A robotics network system includes a network of robots. Each robot may be equipped with one or more sensors. The sensors may include sensors for monitoring a specific phenomena, reporting data to a base-station, and exchanging messages with other robots. The robots have movement capability and can perform actions by way of communication through a wireless sensor network. The robots may dynamically adjust their positions by self-spreading such that a covered area is maximized while maintaining the inter-robot connectivity. Provided the sensor data, robots can take action that is deemed feasible and appropriate for a given environment. The robots may be deployed and take action in, for example, harsh environments where human intervention is not possible.

The robotics network system includes a set of landmarks at pre-determined positions in an area of interest A that has a set of landmarks (N). The system may also include a volume of interest V that has a set of landmarks (N) at fixed points in three-dimensional space. Robots that may be deployed in a volume of interest V may include drones or driverless vehicles or aircraft.

The landmarks are used to guide the robots deployment process. A set of the landmarks N' is equipped with special capabilities, for example, sensing and computational resources, to enable them to assess the situation in their vicinity and request the presence of a number of robots (d) to perform certain tasks. A set of robots R is initially randomly deployed in (A). A sample scenario is presented in section II where landmarks, denoted with a point inside a circle, are present in the deployment scene and each one has a specific demand shown below the circle of each landmark. The robots, which are the points inside a circle, are dropped initially in the center of the area of interest. The goal is to develop a distributed mechanism for the robots self-deployment such that the requirements of each landmark are met. The following enumerates key system model assumptions:

1. Each landmark node knows its location.
2. Robots are homogeneous, i.e., have the same speed, service capabilities, energy supply, etc.
3. Each landmark can request a number of robots depending on the need of services in its area.
4. Landmarks can communicate with each other and exchange information.
5. Each robot knows its initial position.
6. The positions of landmarks and their demand are unknown to robots.

Figure 1:
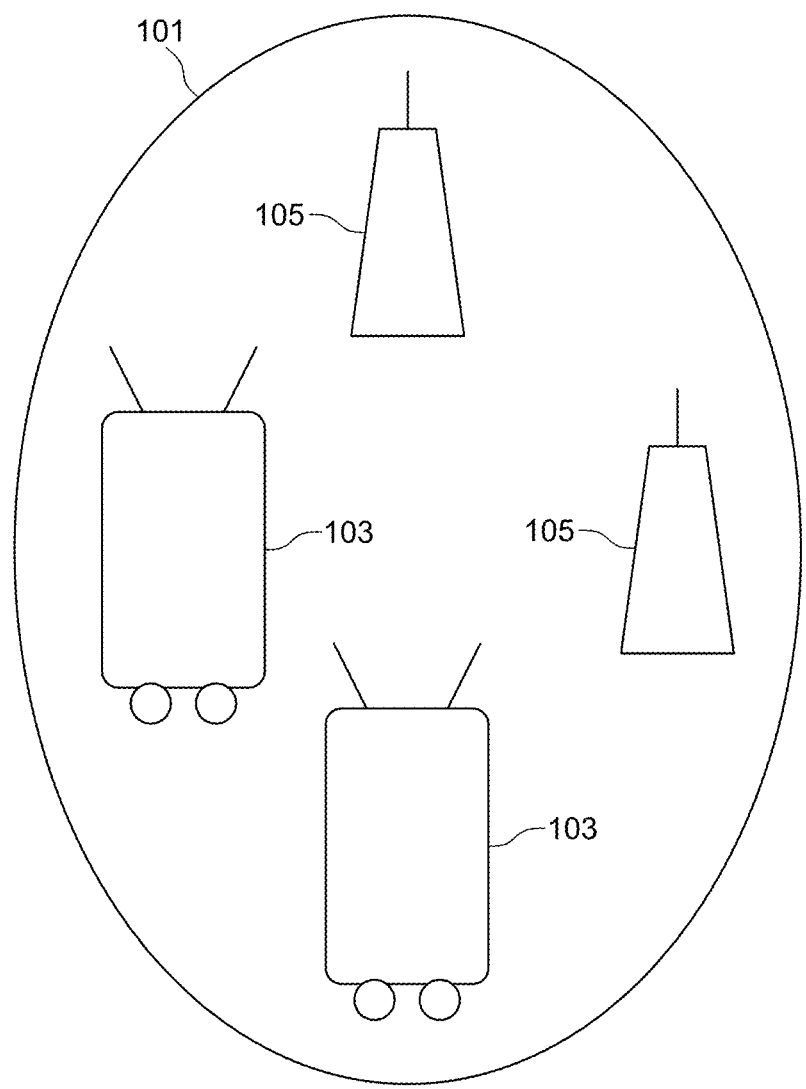
FIG. 1 illustrates an example robotics network system.

FIG. 1 illustrates an example robotics network system. The robotics network system includes a set of mobile robots 103 deployed in a region of interest 101. The mobile robots may be guided by a landmark 105.

Figure 2:
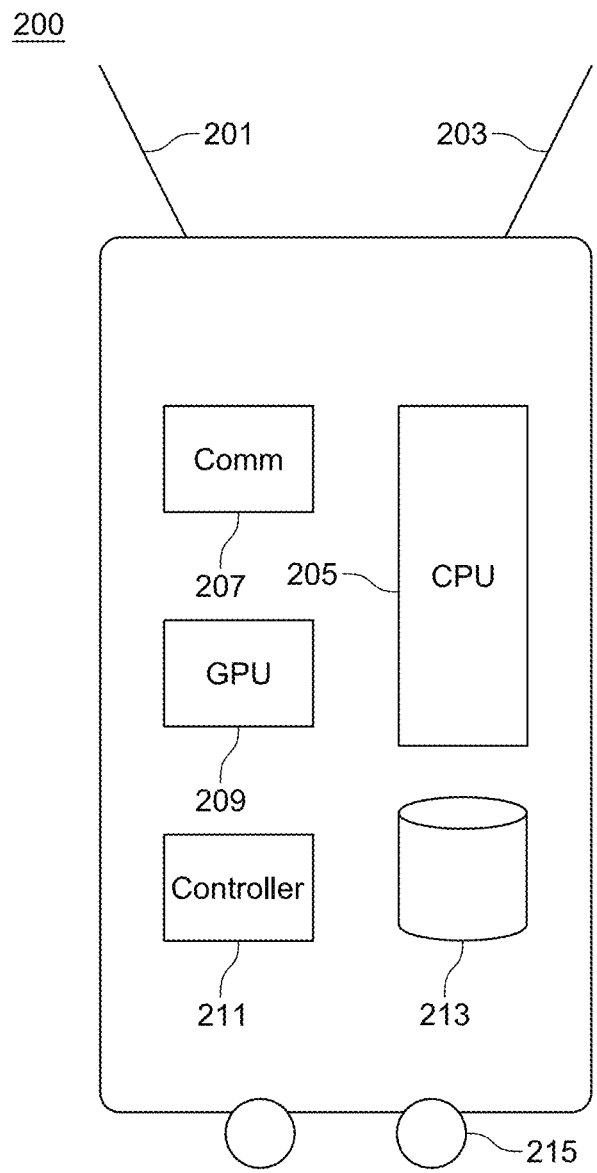
FIG. 2 illustrates an example mobile robot.

FIG. 2 illustrates an example configuration for a mobile robot 200. The mobile robot may include one or more antenna 201, one or more sensors 203, a communications circuit 207, a central processing unit 205 having one or more processors, a graphics processing unit 209, a micro-controller 211, and a local memory 213. The mobile robot may be one that moves on a surface and has some type of wheel, tread belt or leg-like mechanism 215. In other embodiments, a robot may be one that is capable of movement in three-dimensions, such as a drone aircraft. Movement information, such as movement direction, movement speed, may be controlled by a micro-controller. The antenna 201 transmits signals in a range that can extend to the boundary of the region of interest 101. The graphics processing unit 209 enables fast processing for reasoning that is performed by a robot. The local memory 213 may store software for operating the robot, as well as history information of actions performed during deployment in a region of interest 101.

Figure 3:
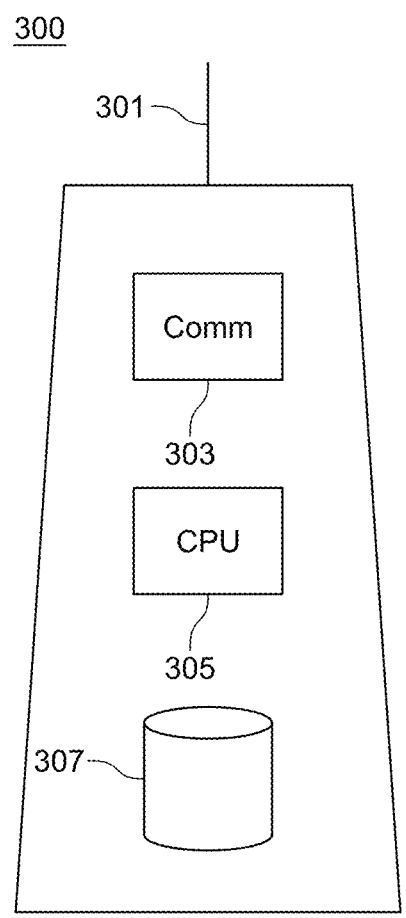
FIG. 3 illustrates an example landmark.

FIG. 3 illustrates an example landmark 300. The landmark may include a communication circuit 303, one or more communication antenna 301, and a central processing unit 305 having one or more processors. A local memory 307 may contain software for controlling communication and action by the landmark. Control of a landmark is performed by the central processing unit 305.

TABLE I

LIST OF SYMBOLS

| | |
|---|---|
| R, $R_f$, $R_a$ | Robots, Free robot, Associated robots |
| L | Landmarks |
| $d(L_j)$ | Demand of landmark j |
| $N_r(R_i)$ | Neighbor robots of robot $R_i$ |
| $N_l(R_i)$ | Neighbor landmarks of robot $R_i$ |
| $w_a$ | Attractive force |
| $w_r$ | Repulsive force. |
| $d_{ij}$ | Distance between robot $R_i$ and robot $R_j$ |
| $d_{th}$ | Distance threshold between robots |

TABLE I-continued

LIST OF SYMBOLS

| | |
|---|---|
| $\Theta_{ij}$ | Angle between robot $R_i$ and robot $R_j$ |
| $\beta$ | Repulsive force factor. |
| $C_{th}$ | Maximum communication range |
| $F_{ij}$ | Force applied on robot $R_i$ from robot $R_j$ |
| $F_{ir}$ | Repulsive force applied on robot $R_i$ from a landmark |
| $F_i$ | The total force applied on robot i |

Symbols used below are defined in Table 1.

Denote R to be a set of robots initially dropped at any point in the area of interest. N is the total number of robots and let i denote each specific robot, where i=1, ..., N Each robot has a communication range $R_c$, within its range it can communicate with other robots and landmarks. Denote L to be a set of landmarks distributed randomly in the area of interest. The number of landmarks is M and let j denote each landmark where j=1, ..., M Each land mark has a demand $d(L_j) \geq 0$, the demand is represented by a number of robots that should be around a given landmark. Any robot can be in one of two states: free or associated. Free robots are those which are not associated with any landmark yet. Denote $R_f$ to be the set of free robots, initially $R_f$=R. Associated robots are those that successfully get associated to a landmark ($R_i$, $L_m$). Denote $R_a$ to be the set of associated robots. The aim is to make the number of associated robots $|R_a|$ equal the total demand of the landmarks $|R_a|=\Sigma d_j$. The landmark that a robot is associated with is denoted by $L_{R_i}$. Each robot $R_i$ has a set of neighbor robots $N_r(R_i) = \{R_n : |R_{x_i,y_i} - R_{x_n,y_n}| < R_c, n \neq i, n=1, \Box, N\}$ and neighbor landmarks $N_l(R_i) = \{L_m : |L_{x_i,y_i} - L_{x_m,y_m}| < R_c, m=1, \Box, M,)\}$. The neighbor robots of robot $R_i$ can be either free $N_r(R_i) \in R_f$ or associated $N_r(R_i) \in R_a$. And the neighbor landmarks can be either satisfied (i.e. $d(N_{L_j}(R_i))=0$) or not satisfied (i.e. $d(N_{L_j}(R_i))>0$).

Disclosed is a technique that modifies virtual force such that it accounts for the criticality of each preferential point (landmark) based on a cooperation between landmarks and robots. The cooperation is based on the number of landmarks, their demands and the local demand in the range of each robot and landmark. The disclosed technique is an improvement of the work in Sallam et al. in order to overcome some of its limitations such as the deadlock and improve the performance of VF especially in terms of demand satisfaction, total time, and distance.

Two-Hop Cover

R Robots will be initially dropped at any point in the area of interest. Robots will utilize virtual force among themselves to spread over the area and to improve the chances of locating landmarks that are having demand. Each robot computes the composite virtual force and moves accordingly. In each move, each robot stops for a while to collect messages from other robots and landmarks to decide its next step. Each unassociated (free) robot will behave as in algorithm 1. Basically, it will receive two kinds of messages.

1) Messages from other robots that are not associated with any landmarks. These messages are treated normally as in the basic virtual force (i.e. the robots will utilize them to compute either an attractive force or a repulsive force depending on the distance to the source robot as in (1).

2) Messages from landmarks $L_{replies} \subseteq L$ or other robots $R_{aReplies} \subseteq R_a$ that are already associated with a landmark. For each landmark $L_j \in L_{Replies}$. If $d(L_j)>0$, it will be a demand message of landmark $L_j$. If $d(L_j)=0$ and $d(N_l(L_j))>0$, it will be a list of landmarks and their demands. Otherwise, the message will be a repulsive force; these details are presented in algorithm 4. For each robot $R_i \in R_{aReplies}$, if $d(L_{R_i})>0$, it will be a demand message on behalf of landmark $L_{R_i}$; if $d(L_j \in N_l(R_i))>0$, then the robot $R_i$ will reply with a list of landmarks and their demands. Otherwise, it will exert a repulsive force to increase the chance that a robot will move in a direction where it can find landmarks with demand; these details are shown in algorithm 3.

The landmarks announce their demands in terms of a specific number of robots. Robot $R_i$ that hears the demand message will add that landmark to a list $dl=\{(L_k, d_k)|k=1, \ldots, N_l, \text{ where } N_l=|N_l(R_i)|\}$ in order to respond to the nearest one based on the Euclidean distance. In order to avoid more than needed robots move toward one landmark, an association process is proposed. Each robot first sends an association message to the nearest landmark $L_k \in d_l$. Then, if $d(L_k)>0$, it will reply with a confirmation message. Otherwise, it will send a rejection message. If the robot receives a confirmation message, it will not move immediately toward it, rather, it will stay in its current position until it either finds out that none of its neighbor landmarks has a demand or after multiple iterations (i.e. wait for a certain time). The logic behind this is that initially the robots are close to each other and when one of the robots gets associated, the possibility of being in help for its landmark or other neighbor landmarks is high if this robot stays near to other free robots. If the robot receives a rejection message, it will contact the next landmark in its dl if it already has heard from multiple landmarks. If the robot fails to associate to any landmark, it will proceed by computing the composite virtual force as shown below and move accordingly. The total force is calculated as follow:

$$F_i = \sum_{j=1, j \neq i}^{k} F_{ij} + \sum_{r=1, r \neq i}^{L} F_{ir} \quad (1)$$

where $j \in N_{Rf}(R_i)$, L is the number of robots $\in N_{Ra}(Ri)$ and $d(N_l(R_a))=0$ and the landmarks $\in N_{Ls}(R_i),)$ and $d(N_l(L_s),))=0$.

In computing the composite virtual force, two cases are differentiated. The first case where neighboring robots are not associated with any landmark, then, the calculation goes as the basic virtual force based on (1).

$$F_{ij} = \begin{cases} w_a(d_{ij} - d_{th}), \theta_{ij} & \text{if } d_{ij} > d_{th} \\ 0, & \text{if } d_{ij} = d_{th} \\ w_r * \dfrac{1}{d_{ij}}, \theta_{ij} + \pi & \text{if } d_{ij} < d_{th} \end{cases} \quad (2)$$

$$W_a = \left(\dfrac{D_{th}}{C_{th}}\right) * (\text{number\_of\_robots})^{-\alpha} \quad (3)$$

$$W_r = \text{number\_of\_robot}^{\alpha} \quad (4)$$

The second case is where the received messages come from associated robots or from landmarks, the calculation is as follows. For repulsive messages:

$$F_{ir} = \dfrac{\alpha * W_r}{d_{ir}} \quad (5)$$

a is an arbitrary but predetermined tuning parameter, e.g., a can take the value 2 (in the presented experiments a=3/2), and the "number of robots" represents a number of mobile robots. Increasing the value of a increases the repulsive force and decreases the attractive force. Decreasing the value of a decreases the repulsive force and increases the attractive force.

In this part, the algorithms is shown for robot in case it is free (unassociated) or associated and for the landmarks.

Algorithm 1: The algorithm for the operation of unassociated robots according to Two-hop COVER.

| | |
|---|---|
| 1: | Robot $R_i$ sends a neighbors position inquiry message |
| 2: | $R_i$ receives position reply messages from robots ($R_k \in N_r(R_i)$) and landmarks $L_k \in N_t(R_i)$): |
| 3: | for all replies of $L_k \in N_t(R_i)$ do |
| 4: | if $d(L_k) > 0$ then |
| 5: | add $L_k$ to the potential demanding landmarks list dl. |
| 6: | else if $d(L_k) == 0$ $ the demand of its neighbors $d(L_a \in N_t(L_k)) > 0$ then |
| 7: | add $L_a$ to dl |
| 8: | else |
| 9: | add the $L_k$ to the repulsive force list $F_r$. |
| 10: | end if |
| 11: | end for |
| 12: | for unassociated robots' replies $R_k \in N_r(R_i)$ do |
| 13: | if the Euclidean distance $|R_i - R_k|$ < Threshold then |
| 14: | add $R_k$ to the repulsive force list |
| 15: | else |
| 16: | add the robot $R_k$ to the attractive force list |
| 17: | end if |
| 18: | end for |
| 19: | Process dl list according to algorithm 2 |
| 20: | if Failed to associate then |
| 21: | Compute the composite virtual force (VF) |
| 22: | Compute the new position and relocate to it |
| 23: | end if |

Algorithm 2: The algorithm for the processing of potential landmark list dl.

| | |
|---|---|
| 1: | Repeat |
| 2: | Choose the nearest landmark ($Lj \in dl$) and associate to it either directly or through another landmark or robot. |
| 3: | if succeed then |
| 4: | Mark this robot as associated (i.e. $Ri \in Ra$) |
| 5: | Change Robot status to associated |
| 6: | if the association was done directly then |
| 7: | The robot stays in its current position |
| 8: | else if The robot associated through another landmark or robot then |
| 9: | Move until gets in range with its associated landmark |
| 10: | end if |
| 11: | else: |
| 12: | Remove this landmark Lk from the list dl |
| 13: | end if |
| 14: | until dl is empty |

Algorithm 3: The algorithm for the operation of associated robots according to Two-hop COVER.

| | |
|---|---|
| 1: | if $d(L_{R_i}) == 0$ && the demand of its neighbors $d(L_a \in N_t(R_i)) == 0$ ǁ current time − association time > threshold then |
| 2: | relocate to a position determined by its landmark |
| 3: | end if |
| 4: | if $R_i$ receives position request message then |
| 5: | if $d(L_{R_i}) > 0$ then |
| 6: | reply with a demand request on behalf of $L_{R_i}$ |

Algorithm 3: The algorithm for the operation of associated robots according to Two-hop COVER.

| | |
|---|---|
| 7: | else if my neighbor landmarks demand $d(L_a \in N_t(R_i)) > 0$ then |
| 8: | Reply with a list of the landmarks that have a demand $d(L_a) > 0$ |
| 9: | end if |
| 10: | else if receive an association request then |
| 11: | Forward it to the required landmark |
| 12: | else if receive an association accept or reject from a landmark then |
| 13: | Forward it to the required robot |
| 14: | else |
| 15: | reply with a repulsive force |
| 16: | end if |

Algorithm 4: The algorithm for the operation of the landmark according to COVER

| | |
|---|---|
| 1: | for all landmarks ($L_j \in L$) do |
| 2: | if $L_j$ receives a position request message from a robot then |
| 3: | if $d(L_j) > 0$ then |
| 4: | Reply with its position and demand. |
| 5: | else if $d(L_j) == 0$ & $d(N_t(L_j)) > 0$ then |
| 6: | Reply with a list of the landmarks that have a demand > 0 |
| 7: | Reply with its position and demand |
| 8: | else |
| 9: | work as a repulsive force |
| 10: | end if |
| 11: | else if receives associate message then |
| 12: | if $d(L_j) > 0$ then |
| 13: | Reply with accept message, and position to come to it. |
| 14: | else if $d(L_j) == 0$ then |
| 15: | Reply with a reject message. |
| 16: | else if the request to a neighbor landmark then |
| 17: | Forward it to the required landmark |
| 18: | end if |
| 19: | else if receive accept or reject message from a landmark to a robot then |
| 20: | Forward it to the required robot |
| 21: | end if |
| 22: | end for |

Figure 4A:
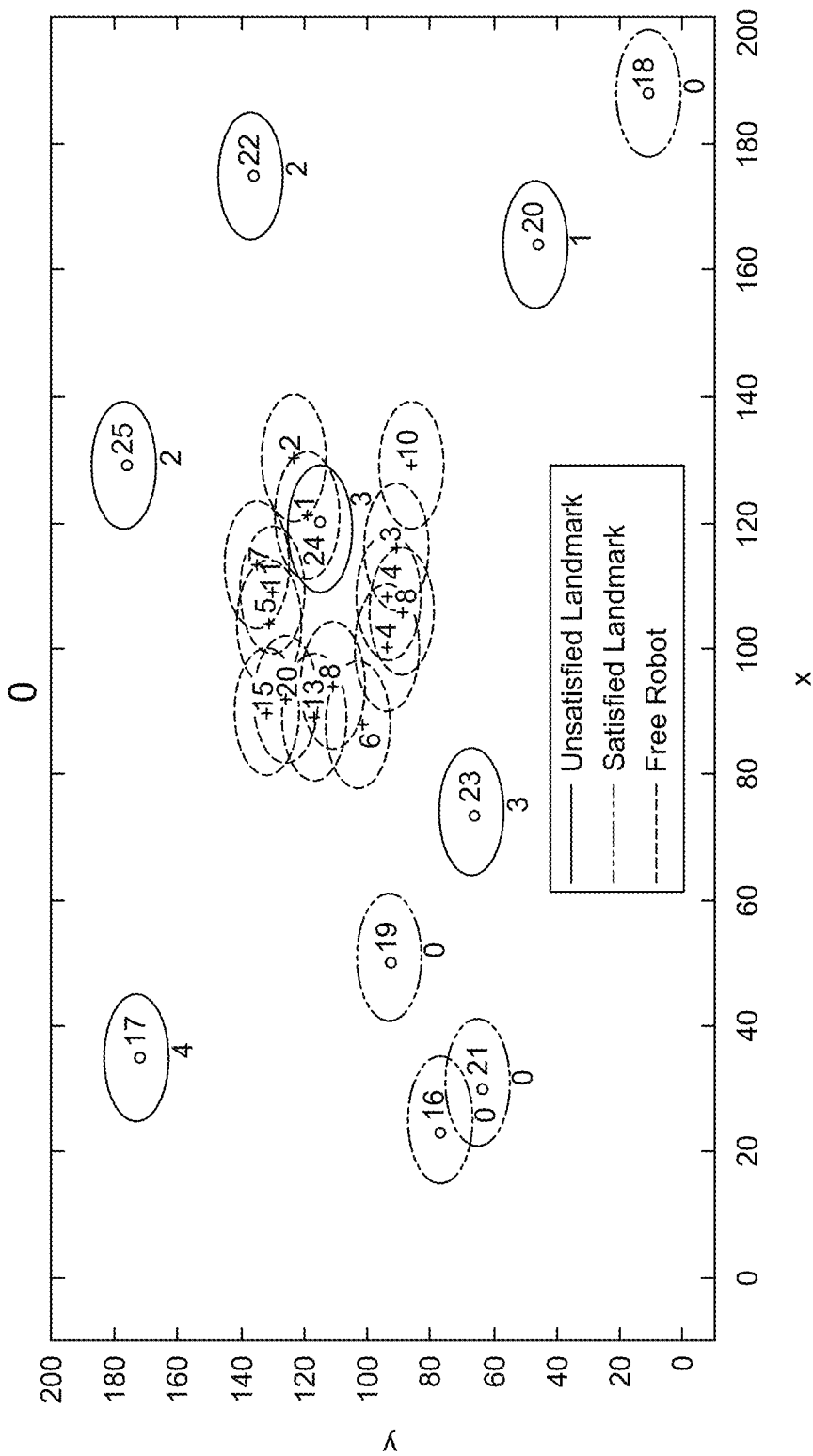
FIGS. 4A-4B illustrate an example of the cooperative landmarks and robots using virtual force. The number below the red circle is the demand of that landmark.
Figure 4B:
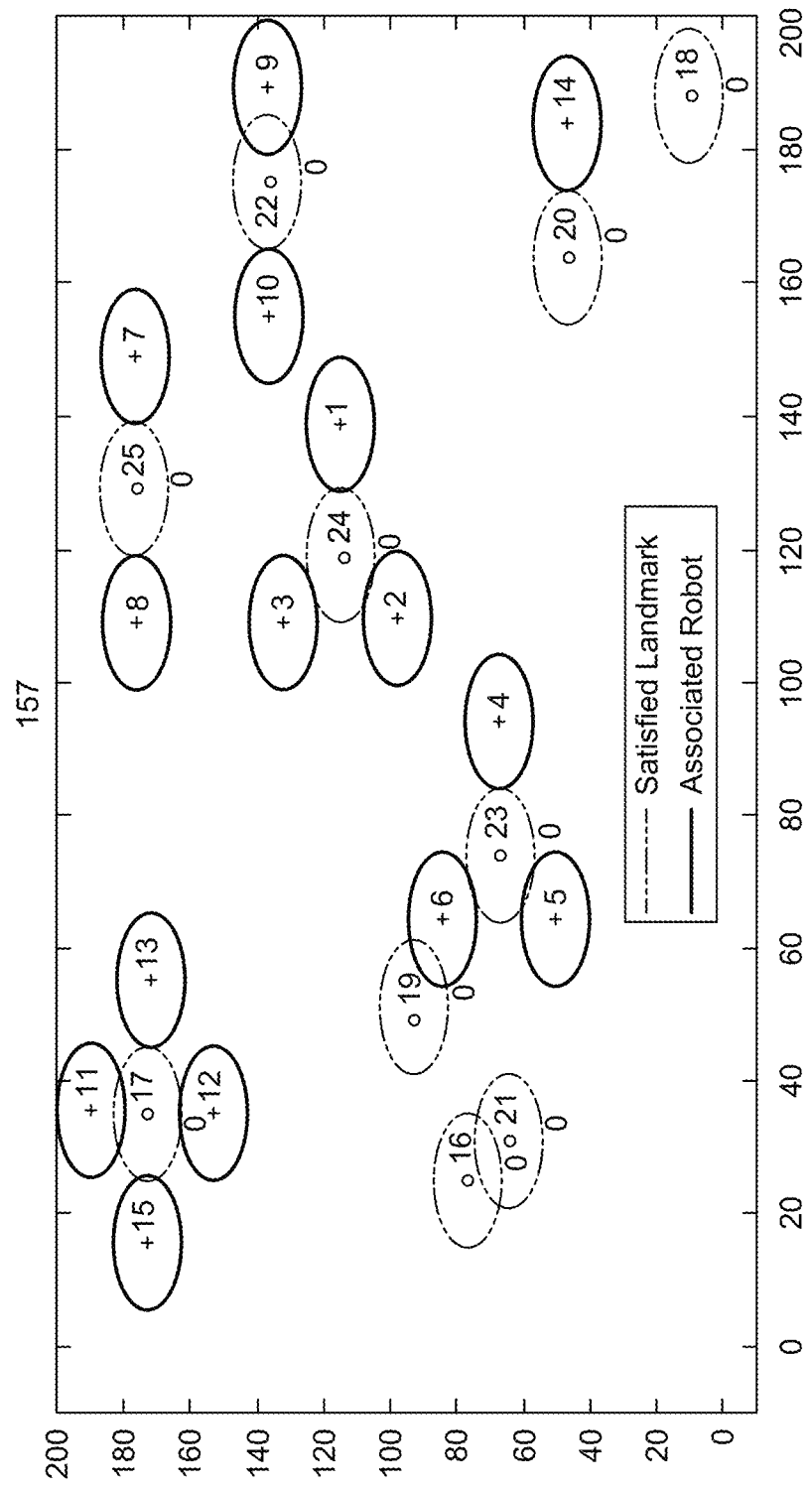
Figure 5:
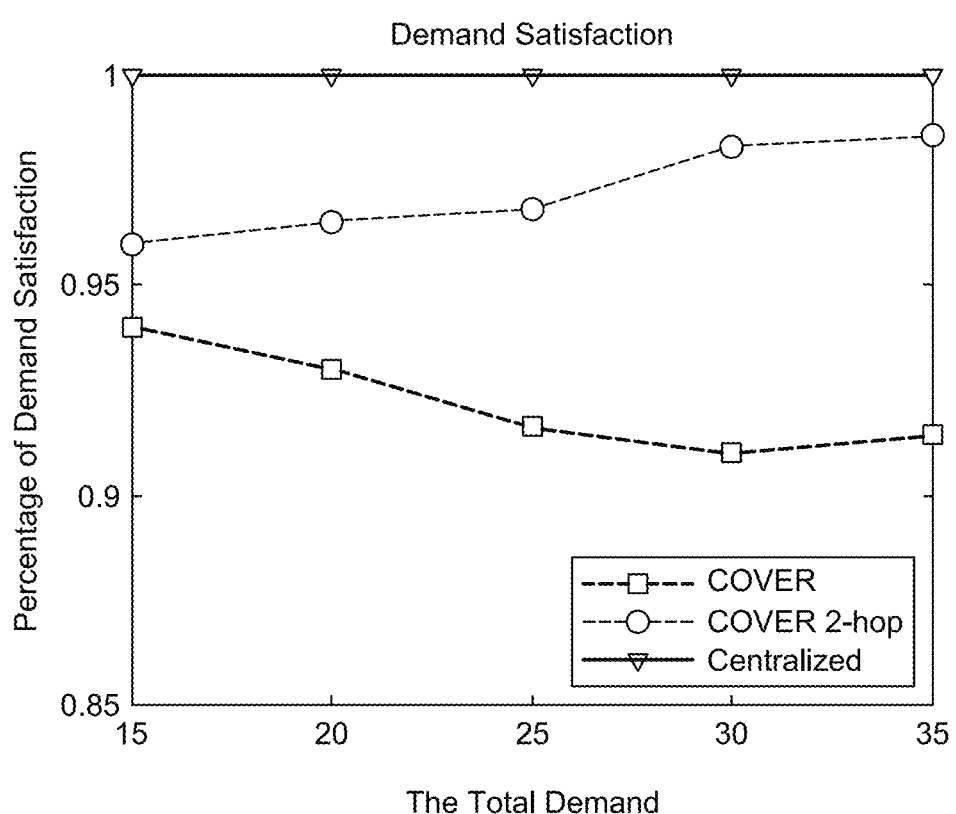
FIG. 5 illustrates the percentage of demand satisfaction, the number of robot=the total demand, area size===150 m×150 m, communication range===50 m.

In the scenario presented in FIG. 4, there are 10 landmarks numbered. (16 to 25) with demand vector [0, 4, 0, 0, 1, 0, 2, 3, 3, 2], respectively. 15 robots are placed in the center of the area. They use virtual force among them in order to spread throughout the area and search for landmarks. Once a robot receives a message from a landmark, it starts responding to it. If it receives from multiple landmarks it will respond to them, one by one based on predefined criteria here the distance between robot and landmark is considered as the decisive factor to join a certain landmark. In this scenario, all the landmarks will get their demands. All the landmarks are able to get their demand from the first slot. Only landmark 17 and 20 have to wait until some robots come to their range. Robots 11-15 will use virtual force for many slots until robot 14 gets in range of landmark 20 and associate to it. Also, robot 15 gets in the range of landmark 17 and associate to it. Robot 15 also helps other robots (11, 12, and 13) to associate with landmark 17.

In order to evaluate the two-hop COVER extensive simulation experiments have been conducted examining the effectiveness on different setups. The simulation is implemented using Matlab using the parameters in table 2.

The performance metrics used in this study are: 1) Demand satisfaction: this metric measures the percentage of demand that is satisfied by the end of the implementation of the algorithm. 2) The total traveled distance: this metric is used to measure the total distance moved by the robots in order to achieve the level of demand satisfaction reached by each approach. 3) The total time needed to achieve the demand satisfaction reached by each approach. It is the time until the last associated robot reaches the position determined by its landmark. 4) Total messages: this metric counts the number of messages that are utilized in the implementation of two-hop COVER algorithm. The messages are mainly due to the cooperative virtual force messages.

All the above metrics can be used to implicitly measure the energy consumption because the total distance and messages are the main sources of energy consumption.

TABLE II

SIMULATION PARAMETERS

| Parameters | Value |
| --- | --- |
| Simulation tool | Matlab |
| Number of robots (randomly distributed) | 15, 20, 25, 30, 35 |
| Number of landmarks (randomly distributed) | 10 |
| Total landmarks' demand (randomly distributed) | 10, 15, 20, 25, 30, 35 |
| Robots' transmission range | 50 m |
| Landmarks' transmission range | 50 m |
| Area size | 150 m × 150 m, 200 m × 200 m |
| Stopping criterion | Total force ≈ 0 |

Two-hop COVER is compared with two other approaches namely, Hungarian algorithm (centralized approach), COVER. Each approach is described as follows. 1) Hungarian algorithm (Centralized approach): a problem relates to a set of resources R (robots), and a set of demands D of landmarks. The Hungarian method solves this problem by assigning the best robots to each landmark based on the distance between robots and landmarks, its complexity is O(n3). 2) COVER: this approach is the one is improved over. In COVER, the same procedure of the two-hop COVER is used except that when a robot gets associated (i.e. $R_i \in R_a$) or when a landmark has been satisfied (i.e. d($L_j$)=0), it will collaborate with other landmarks that are having demand not satisfied yet (i.e. d($L_j$)>0) by applying an attractive force on free robots ($\in R_f$) toward the landmark with the highest demand. Moreover, when a robot gets associated to a landmark, it will immediately move toward it, in opposite to two-hop COVER where the robot will stay in its current position until it either finds out that none of its neighbor landmarks has a demand or after multiple iteration (i.e. wait for a certain time).

In order to evaluate the performance of two-hop COVER, extensive simulations were conducted for different scenarios. In both approaches, the number of landmarks is 10 randomly distributed over the area. The number of robots ranges from 15 to 35 and also are distributed randomly over the area. The demand is set to equal the number of robots.

The results of two-hop COVER are presented in FIGS. 5, 6, 7, 8. The percentage of demand satisfaction is presented in FIG. 5. It can be seen that the Two-hop COVER is able to reach a around 97% level of demand satisfaction compared to the level achieved by the centralized approach. This is due to the utilization of the two-hop communication which allowed the robots to reach to landmarks that are out of their ranges. In addition, since the associated robot stays for a while in its position immediately after getting associated, this assumed to help in using the two-hop communication to satisfy the demand of its landmark. Two-hop COVER approximately reaches 100% demand satisfaction especially when the number of robots is high compared to the area size and better than the original COVER.

Figure 6:
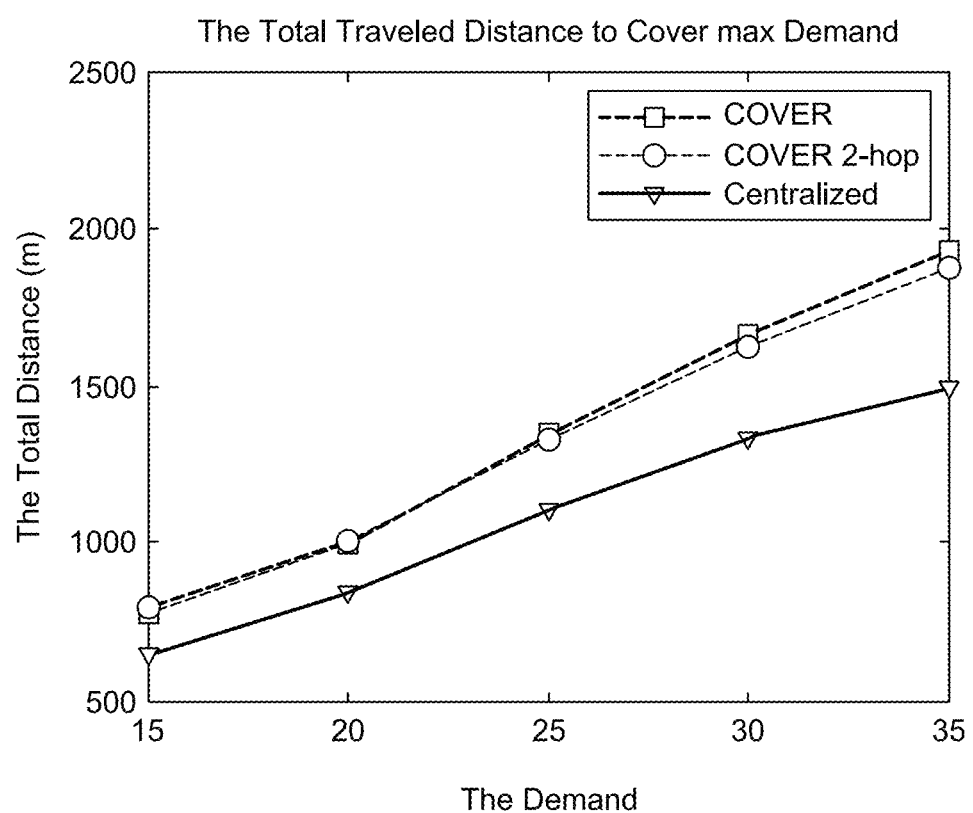
FIG. 6 illustrates the total traveled distance to reach the achieved demand satisfaction, the number of robots=the total demand, area size=150 m×150 m, communication range=50 m.
Figure 7:
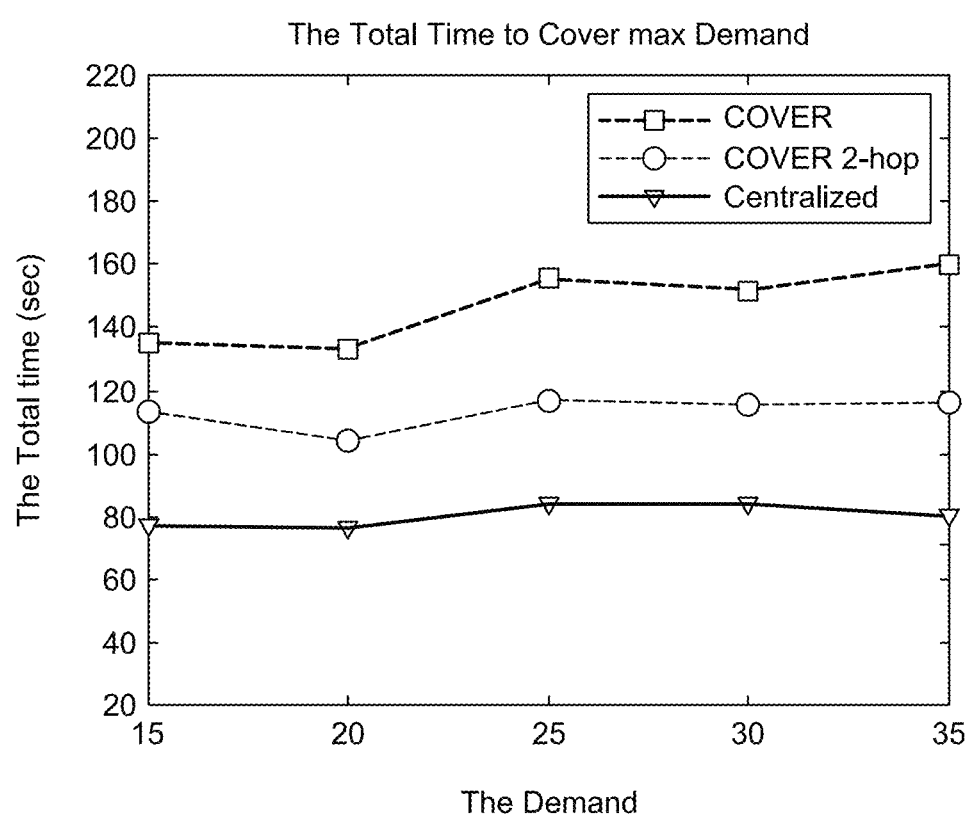
FIG. 7 illustrates the total time needed to reach the achieved demand satisfaction, the number of robots=the total demand, area size=150 m×150 m, communication range=50 m.
Figure 8:
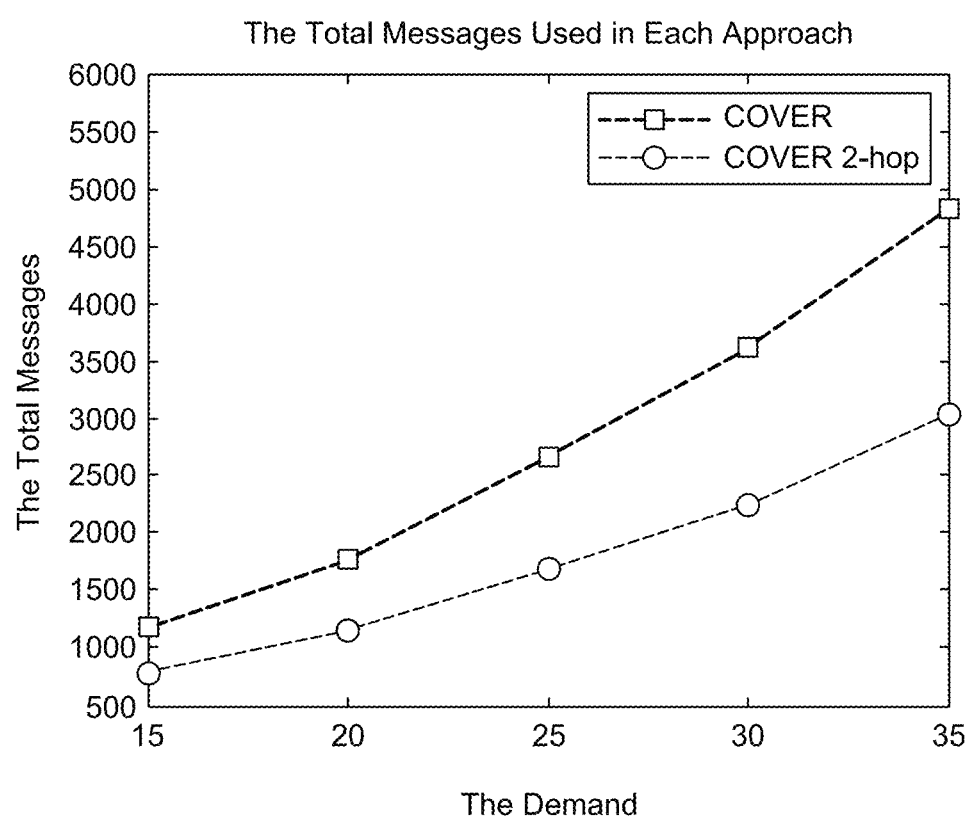
FIG. 8 illustrates the total number of messages used in each approach, the number of robots=the total demand, area size=150 m×150 m, communication range=50 m.

For the total traveled distance, Two-hop COVER succeeded to maintain the total distance traveled by all robots to be the same as COVER, although Two-hop COVER achieved a higher level of demand satisfaction which causes the robot to travel additional distances to relocate to its associated landmark. Instead of making a robot moves some distances in order to discover a landmark to be able to communicate with it, the robot utilizes the two-hop communication to reach out the out of range landmarks, but if it succeeds to associate with that landmark, it will eventually travel some distance to get close to its landmark. The total traveled distance is shown in FIG. 6. Another factor is presented in FIG. 7 which is the total time needed to achieve the level of demand satisfaction in FIG. 5 and relocate to the positions determined by the landmarks. Although a waiting time is introduced by the associated robots if their landmark's demand is still not satisfied, Two-hop COVER is able to reduce the total time compared to the original COVER by around 20-30% because Two-hop COVER uses two-hop communication which reduces the main time used to search for a landmark. Also, the Two-hop COVER needed around 40% increase in the total time compared to the centralized approach. The percentage of improvements of Two-hop COVER over COVER is shown in Table III. Two-hop COVER. reduces the total time by around 16% when the number of robots is 15 and by 27% when the number of robots is 35. This happens because increasing the number of robots will increase the chances of using two-hop communication between robots and unsatisfied landmarks. Also, Two-hop COVER takes around 50% increase in the total time compared to the centralized approach.

The total number of messages is the last factor to present in this study. Although the Two-hop COVER uses two-hop associations, it succeeded to reduce the total messages exchanged by around 40-50% compared to COVER because the faster the robot gets associated, the less number of messages will be used. The associated robots will not broadcast any virtual force messages and consequently, no replies will be needed. This way the total messages were reduced as in FIG. 8.

Two-hop COVER approach is cooperative such that landmarks and robots help each other to maximize and expedite the demand satisfaction of landmarks. Two-hop communication reduces the total time and distance. Two-hop COVER is compared with some previous works, namely, a centralized approach and COVER approach. Two-hop COVER achieves high demand satisfaction in less time and less number of messages.

Trace Fingerprint Approach

A complement to Two-hop COVER is described that can guarantee 100% demand satisfaction given that the number of robots is enough to meet all landmarks demand. One possible solution is to let the remaining robots wander the whole area randomly until they locate a landmark with demand. This approach could take long time to satisfy the demand and may not always reach 100% demand satisfaction.

If the area size is large, the robot may not go to the region of demand. Additionally, if the total demand is less than the available robot, then there will be no demand for some of the robots. In this case, they will not find out that there is no need from them and they will keep moving randomly until they deplete their energy. Moreover, the random movements could result in a very high cost in term of the traveled distance and the time needed to locate unsatisfied landmark. So, in order to reduce such randomness and guide the remaining robots throughout the area till they find an unsatisfied landmark, each robot will utilize its history to visit only the locations that it has not visited before. Moreover, each robot will communicate with its neighboring robots and landmarks to use their current positions and history, if applicable, to guide its movements. After applying Two-hop COVER, if a robot fails to associate and the following conditions are satisfied, the robot moves to implement Trace Fingerprint introduced here. The conditions are: 1) there is no force applied on a robot for many iterations (i.e. 10 iterations depends on system parameters like the area size and the speed of the robots). 2) The only force exerted toward the robot is a repulsive force for many iterations (i.e. 15 iterations), then the robot moves to implement Trace Fingerprint.

Figure 9A:
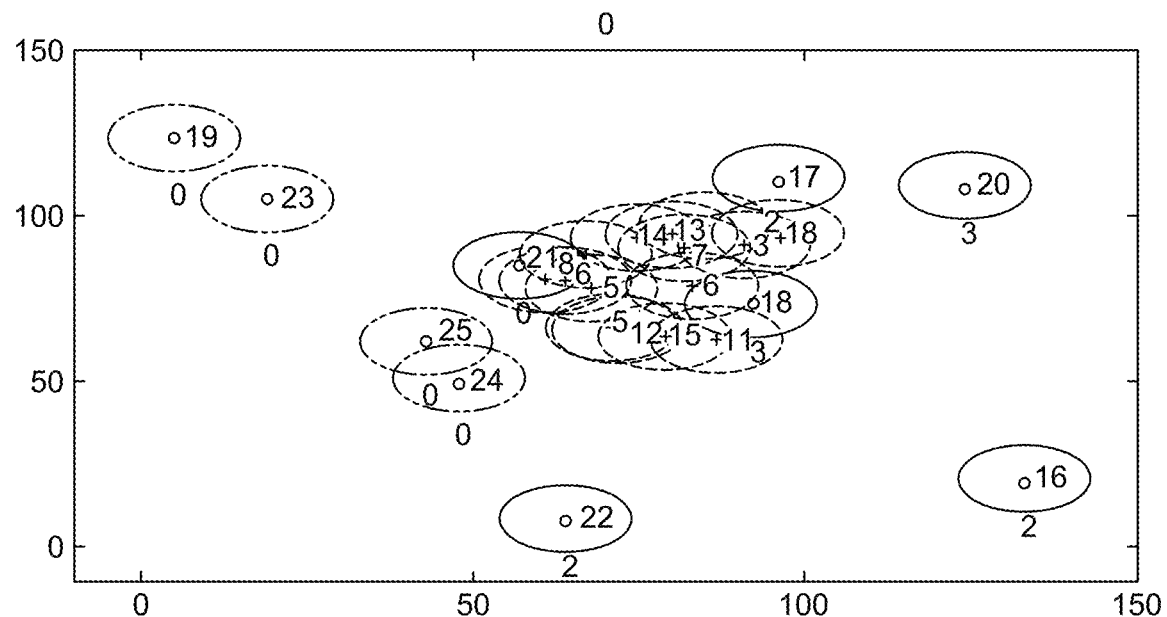
FIGS. 9(A) to 9(F) illustrate an example of how Trace Fingerprint guarantee 100% demand satisfaction.
Figure 9B:
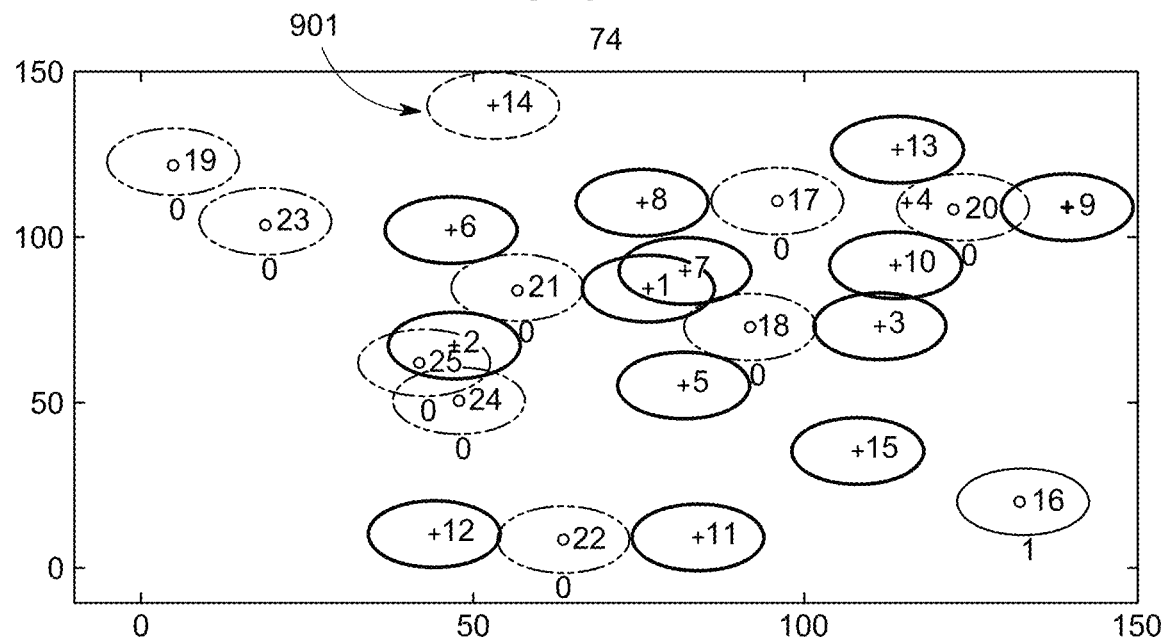
Figure 9C:
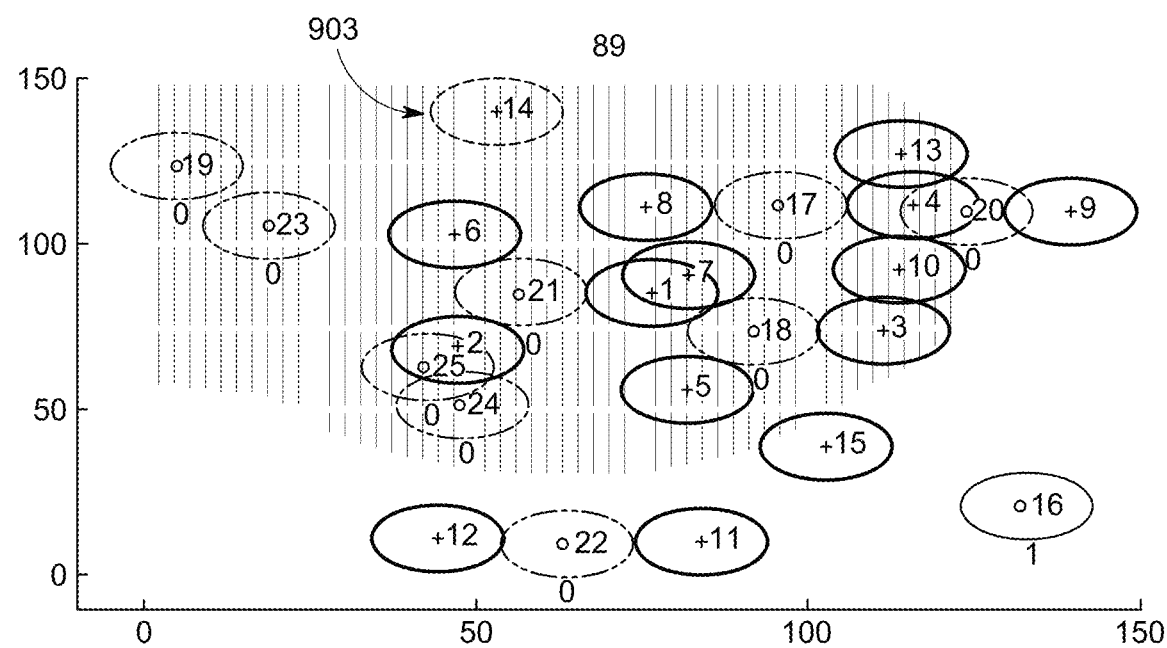
Figure 9D:
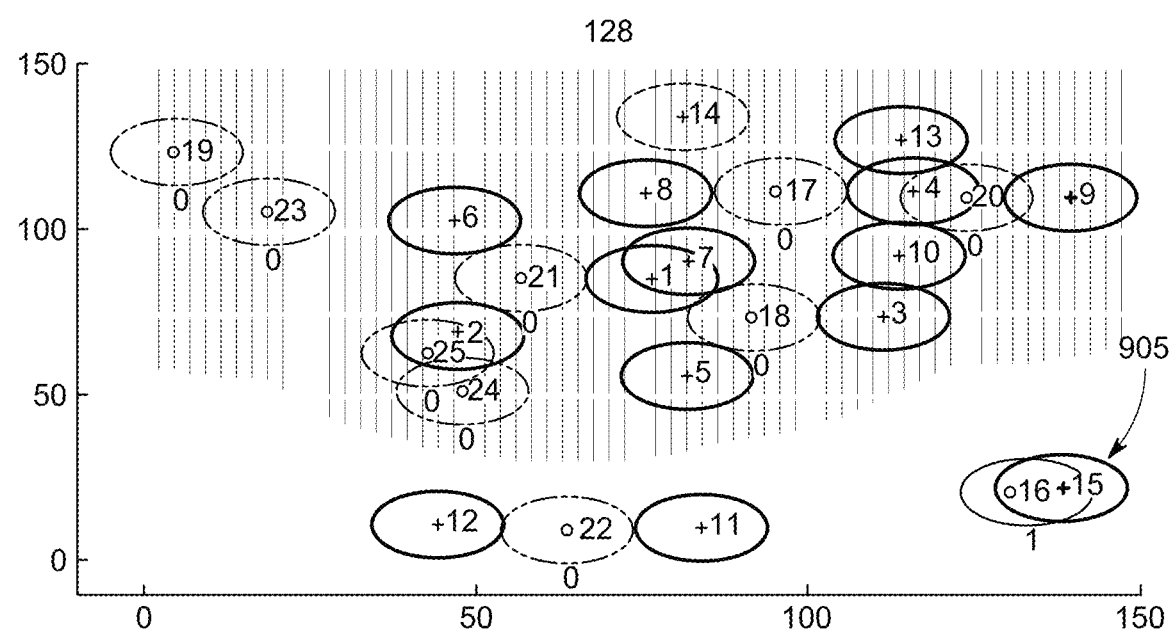
Figure 9E:
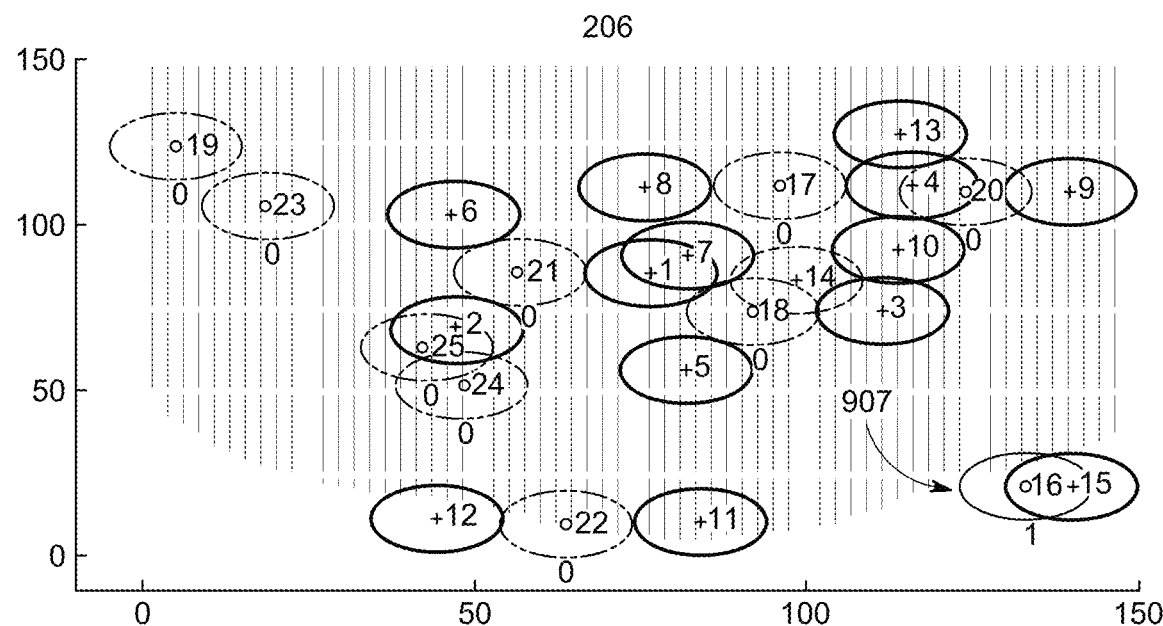
Figure 9F:
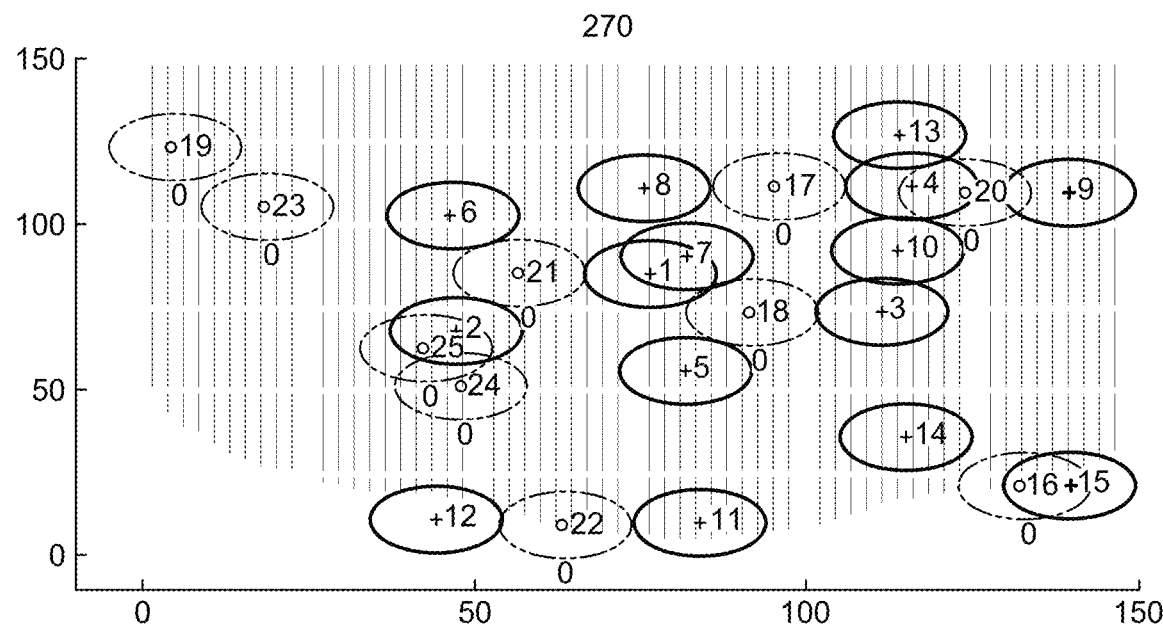

FIGS. 9(A)-9(F) shows an example of Trace Fingerprint approach. FIG. 9(A) is an initial position of the robots and the demand of the landmarks. In FIG. 9(B), according to two-hop COVER, robot 14 (901) could not locate any unsatisfied landmark, so it gets stuck at its position with no force applied on it to direct its movement so it will start the implementation of Trace Fingerprint. In FIG. 9(C), robot 14 (903) will divide the area to squares and compute the coverage of each square based on the history it has built, the covered area is shown with canyon color. Then the robot will move toward the nearest unvisited place which is to the right as in FIG. 9(D) (905). The coverage level computation is repeated again and the robot finds the nearest unvisited place and moves toward it. The process is repeated until the robot gets in the range of the demanding landmark (landmark 16) as in FIG. 9(E) and will associate to it. Then finally, the robot will relocate to a position determined by landmark 16 (907) as in FIG. 9(F).

performance metrics used in this study are: 1) Demand satisfaction: this metric measures the percentage of demand that is satisfied by the end of the implementation of the algorithm. 2) The total traveled distance: this metric is used to measure the total distance moved by the robots in order to achieve the level of demand satisfaction reached by each approach. 3) The total time needed to achieve the demand satisfaction reached by each approach. It is the time until the last associated robot reaches the position determined by its landmark. 4) Total messages: this metric counts the number of messages that are utilized in the implementation of two-hop COVER algorithm. All the above metrics can be used to implicitly measure the energy consumption because the total distance and messages are the main sources of energy consumption.

TABLE I

SIMULATION PARAMETERS

| Parameters | Value |
|---|---|
| Simulation tool | Matlab |
| Number of robots (randomly distributed) | 15, 20, 25, 30, 35 |
| Number of landmarks (randomly distributed) | 10 |
| Total landmarks' demand (randomly distributed) | 10, 15, 20, 25, 30, 35 |
| Robots' transmission range | 50 m |
| Landmarks' transmission range | 50 m |
| Area size | 150 m × 150 m, 200 m × 200 m |
| Stopping criterion | Total force ≈ 0 |

Trace Fingerprint is compared with the Random Waypoint (RWP) approach. Since RWP represents a natural movement for a robot searching for a landmark, RWP is considered as

---

Algorithm 1: The agorithm for the operations of Trace Fingerprint approach

```
1: switch Robot status do
2:    case unassociated
3:       if total force ==0 or all force type== repulsive then
4:          count++
5:          if count > 10 then
6:             change robots status to unassociated searching
7:             get the history of the neighoring robots and the position of the landmarks and add them
       to the history
8:          end if
9:       else
10:         add my next position to the history
11:      end if
12:   case unassociated searching
13:      repeat
14:         divide the area into squares
15:         Compute the coverage level of each square based on the history
16:         make a list of squares that are not fully covered
17:         choose the nearest square and move toward it for a distance d
18:         if gets associated then
19:            change robots status to associated
20:         else
21:            gets the position of the neighbors landmarks and robots and update its history.
22:         end if
23:      until gets associated
24: end switch
```

---

In order to evaluate the Trace Fingerprint extensive simulation experiments have been conducted examining the effectiveness on different setups. The simulation is implemented using Matlab using the parameters in table 1, The a baseline approach. So, two-hop COVER will be applied first, if any robot fails to find a landmark with a demand, it will apply Trace Fingerprint or the RWP until it locates a landmark and associate to it.

Figure 10:
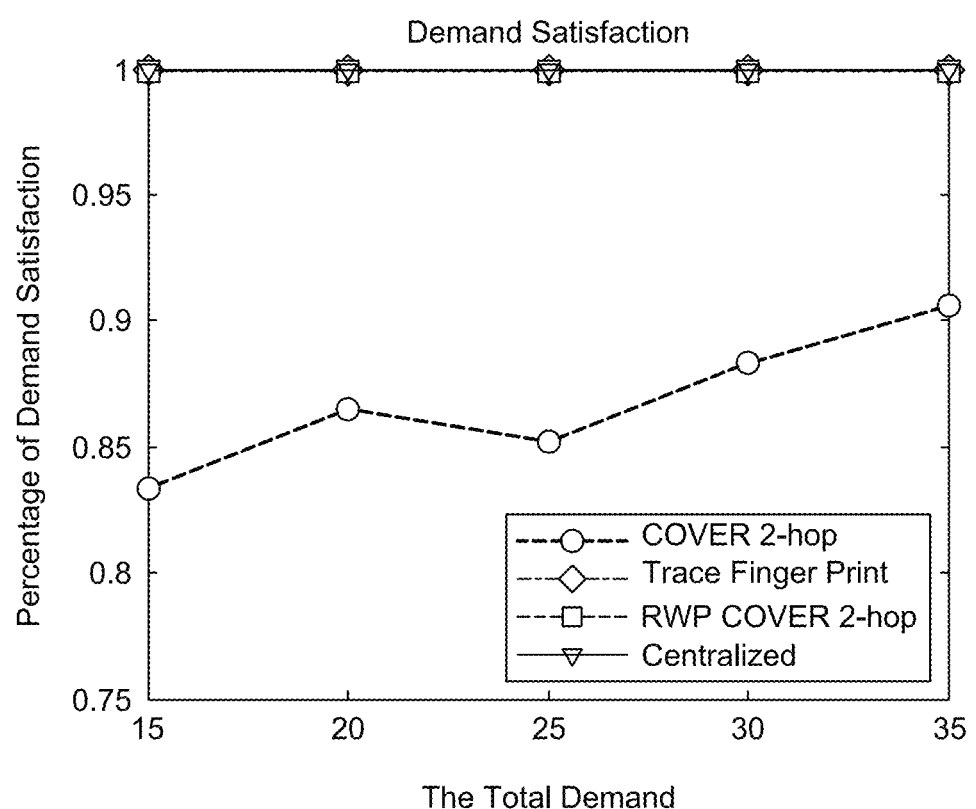
FIG. 10 illustrates the percentage of demand satisfaction, area size=200 m×200 m, communication range=50 m, the number of robots=the demand.
Figure 11:
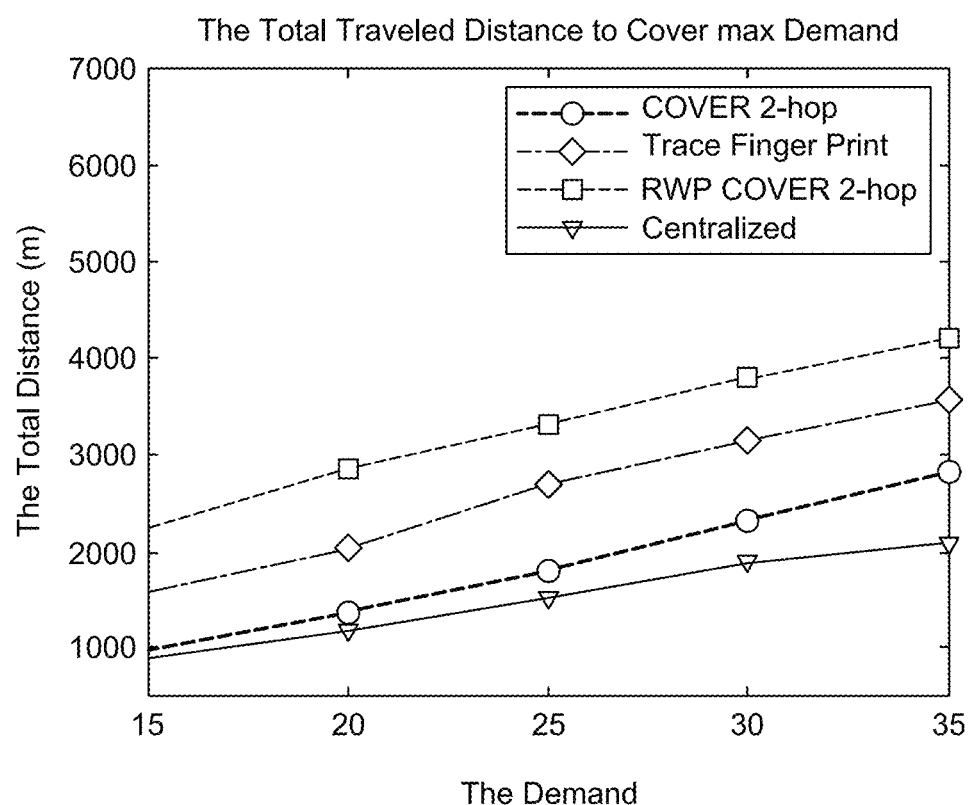
FIG. 11 illustrates the total distance, area size=200 m×200 m, communication range=50 m, the number of robots=the demand.

In order to evaluate the performance of Trace Fingerprint, extensive simulations were conducted for different scenarios. The number of landmarks is 10 randomly distributed over the area. The number of robots ranges from 15 to 35 and also are distributed randomly over the area. The demand is set to equal the number of robots. For Tracefinger Print, it can be seen in FIG. 10 that the Trace Finger Print succeeded to reach 100% demand satisfaction. The same level of demand satisfaction was also achieved by the RWP, however, the difference will be shown in FIGS. 11, 12, 13 regarding the total time, distance, and messages. Trace Fingerprint needed additional movements in order to locate landmarks but this movement was small compared to that needed for the RWP as shown in FIG. 11. While Trace Finger Print caused around 20-30% increase in the distance to reach 100% demand satisfaction compared to the two-hop COVER, RWP caused more than 100% increase in the distance traveled. This shows the effectiveness of the proposed approach to guide the robots' movements rather than making them move randomly. In Trace Fingerprint, robot will not visit the previously visited places by him or by its neighboring robots which increases the chances of locating landmarks quickly and consequently reduces the total traveled distance. Additionally, Table II shows the percentage of distance needed by the Trace Fingerprint and RWP compared to the centralized approach. Trace Fingerprint needs to travel more distance around 70% compared to the centralized, however, the RWP needs more than 150% when the number of robots is 15 and 100% when the number of robots is 35. This shows the effectiveness of the proposed approach to guide the robots' movements rather than making them move randomly. In the Trace Fingerprint, the robot will not visit the previously visited places by him or by its neighbor robots which increase the chances of locating landmarks quickly and reduces the total traveled distance.

TABLE II

THE TOTAL TRAVELED DISTANCE OF TRACE FINGERPRINT COMPARED WITH THE CENTRALIZED AND RWP. THE PERCENTAGES ARE CALCULATED BASED ON THE DIFFERENCE FROM THE CENTRALIZED APPROACH

| Robots | Centralized | Fingerprint | % | RWP | % |
|--------|-------------|-------------|-----|---------|------|
| 15 | 897.60 | 1582.30 | 76% | 2256.70 | 151% |
| 20 | 1181.50 | 2026.30 | 72% | 2871.70 | 143% |
| 25 | 1522.50 | 2701.50 | 77% | 3325.10 | 118% |
| 30 | 1882.50 | 3153.40 | 68% | 3804.10 | 102% |
| 35 | 2083.60 | 3572.30 | 71% | 4199.80 | 102% |

Figure 12:
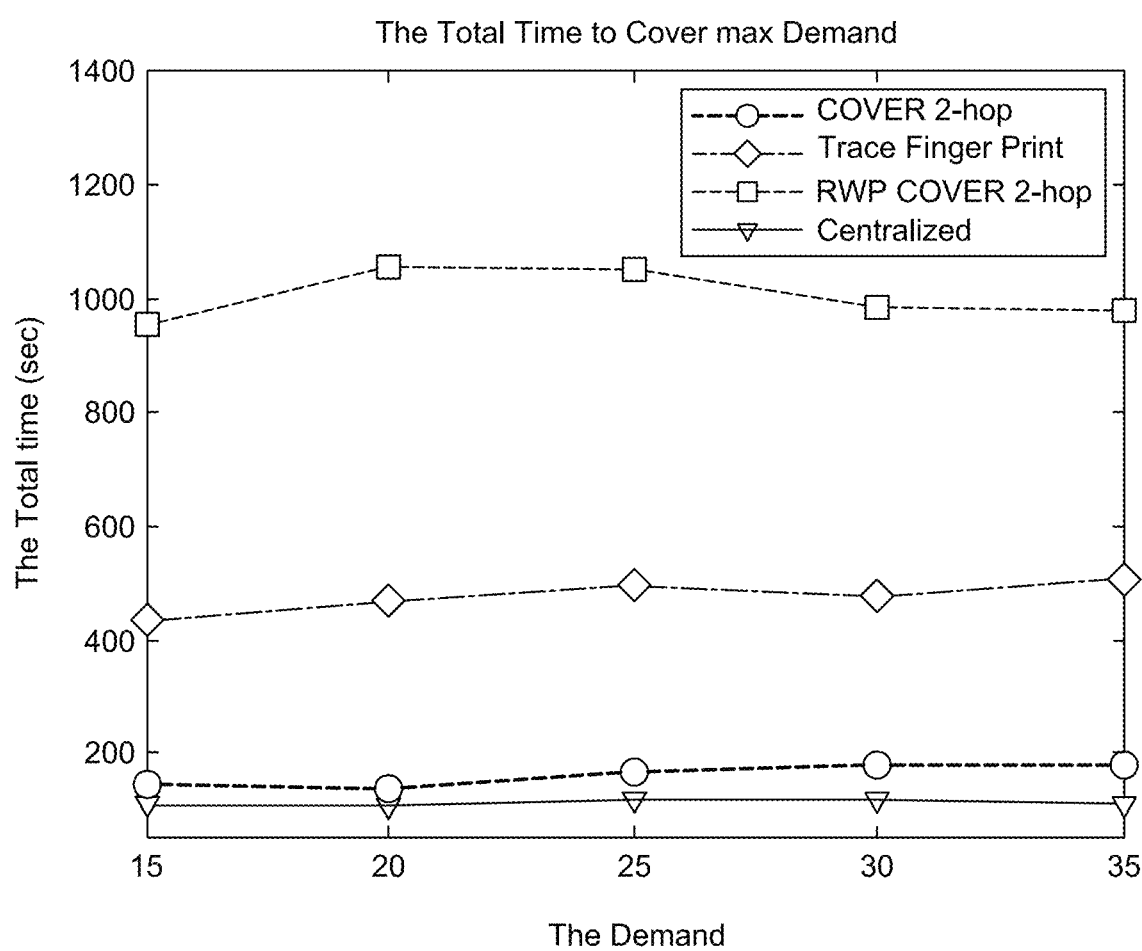
FIG. 12 illustrates the total time, area size=200 m×200 m, communication range=50 m, the number of robots=the demand.
Figure 13:
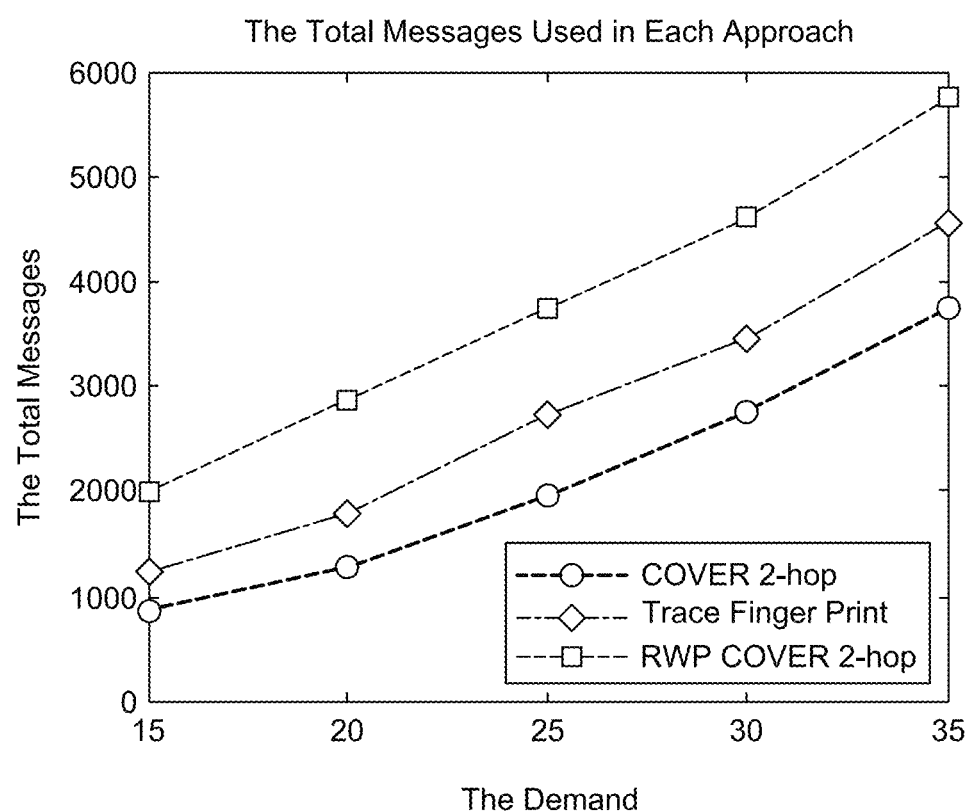
FIG. 13 illustrates the total number of messages, area size=200 m×200 m, communication range=50 m, the number of robots=the demand.

Moreover, due to the guided movements in Trace Fingerprint, the total time needed to reach 100% demand satisfaction is around half the time needed for RWP as shown in FIG. 12. Finally, the longer it takes to reach the maximum demand satisfaction, the higher the number of messages that will be used. So, it can be seen that RWP takes more messages compared to Trace Fingerprint as in FIG. 13. The better performance of Trace Fingerprint compared to RWP comes at a computational cost. Each free robot needs to make calculations that are not needed in RWP. The robot needs to store traces its previously visited locations and the locations of its neighbors. Moreover, at each iteration, the robot needs to find the coverage level of each square in order to decide its next move. So, for time critical applications and with the current advance in the computational resources, such computational overhead can be ignored and consider only the other factors (time, distance, and messages).

The invention claimed is:

1. A method for mobile robot deployment based on two-hop cooperative virtual force, a plurality of mobile robots and a plurality of fixed landmarks that are in a region, the fixed landmarks each having a demand for a number of robots, the method comprising:
    initially dropping the plurality of mobile robots at respective initial points in the region;
    using virtual force, moving one or more of the plurality of mobile robots to a new position over the region, wherein, prior to each move, each of the one or more of the plurality of mobile robots remain in a current position for a predetermined period to collect messages from other ones of the plurality of mobile robots or one or more of the fixed landmarks, wherein each of the plurality of mobile robots is either an associated mobile robot that is associated with one of the fixed landmarks or an unassociated mobile robot that is not associated with one of the fixed landmarks;
    for each unassociated mobile robot:
    for messages collected from one or more other unassociated mobile robots, the unassociated mobile robot computes either an attractive force or a repulsive force depending on a distance from the unassociated mobile robot to a source robot, wherein the attractive force is a virtual force that attracts the unassociated mobile robot toward the source robot and the repulsive force is a virtual force that repels the unassociated mobile robot away from the source robot;
    for messages collected from one or more of the fixed landmarks or associated mobile robots, the fixed landmarks or other associated mobile robots collaborate with any fixed landmarks whose demand has not been satisfied;
    while remaining in the current position for the predetermined period, the unassociated mobile robot sends an association message to a nearest fixed landmark; the nearest fixed landmark replies with a confirmation message or a rejection message;
    maintaining the unassociated mobile robot in the current position on receipt of a confirmation message, and remaining at the current positions until the unassociated mobile robot determines that no neighboring fixed landmarks have a demand or the predetermined period elapses;
    when the unassociated mobile robot receives a rejection message, the unassociated mobile robot contacts a next fixed landmark in a list of fixed landmarks; and
    when the unassociated mobile robot fails to associate to any unsatisfied fixed landmark, the unassociated mobile robot proceeds by computing a composite virtual force, and, when neighboring robots are not associated with any fixed landmark, the unassociated mobile robot moves based on the composite virtual force with respect to the neighboring robots,
    wherein the plurality of mobile robots is deployed until the demand for the number of robots of each fixed landmark is satisfied.

2. The method of claim 1, wherein the region is an area comprising a two-dimensional plane and the plurality of mobile robots are operable to move in the two-dimensional plane.

3. The method of claim 1, wherein the region is a volume comprising a three-dimensional area and the plurality of mobile robots are operable to move in the three-dimensional area.

4. The method of claim 1, wherein the composite virtual force is a total of force applied on the unassociated mobile robot from neighboring mobile robots and repulsive force applied on the unassociated mobile robot from neighboring fixed landmarks.

5. The method of claim 4, wherein when neighboring mobile robots are not associated with any fixed landmark, the composite virtual force is determined as a virtual force in which a force applied on the unassociated mobile robot from neighboring mobile robots is an attractive force or a repulsive force, wherein when the collected messages come from associated mobile robots or from satisfied landmarks, the composite virtual force is a repulsive force that repels the unassociated mobile robot away from associated mobile robots or from satisfied landmarks.

6. The method of claim 1, wherein the collaboration with other fixed landmarks whose demand has not been satisfied includes:
for each fixed landmark whose demand has not been satisfied, if distance from the unassociated mobile robot to the fixed landmark whose demand has not been satisfied is greater than zero, the message will be a demand message of that fixed landmark;
if the distance from the unassociated mobile robot to the fixed landmark whose demand has not been satisfied is zero and the distance to neighboring fixed landmarks whose demand has not been satisfied is greater than zero, the message will include a list of neighboring fixed landmarks and their demands;
otherwise, the message will be a repulsive force repelling the unassociated mobile robot;
for each mobile robot, if the distance from the mobile robot to a fixed landmark is greater than zero, the message will be a demand message on behalf of the fixed landmark; and
if the distance from the mobile robot to neighbor fixed landmarks of the fixed landmark is greater than zero, then the mobile robot will reply with a list of fixed landmarks and their demands,
otherwise, the mobile robot will exert a repulsive force.

7. The method of claim 1, wherein the plurality of mobile robots stores current position information and a history of visited fixed landmarks, and wherein:
when a mobile robot fails to associate with an unsatisfied fixed landmark and the following conditions are satisfied: 1) there is no force applied on the mobile robot for a plurality of iterations, and 2) the only force exerted toward the mobile robot is a repulsive force for the plurality of iterations, then the mobile robot performs a Trace Fingerprint operation to cause the mobile robot to perform operations, including:
dividing the region into squares and determining a coverage of each square based on the history of visited fixed landmarks;
moving toward a nearest unvisited fixed landmark; and
repeat the determining of coverage of the region and moving toward the nearest unvisited fixed landmark until the mobile robot gets within a predefined range of a demanding fixed landmark and associates with the demanding fixed landmark.

8. The method of claim 1, wherein three or more fixed landmarks cover the region.

9. The method of claim 1, wherein respective locations of the fixed landmarks are predetermined.

10. The method of claim 1, wherein each fixed landmark requests a number of robots depending on a demand for services in the region associated with the fixed landmark.

11. A system for mobile robot deployment based on two-hop cooperative virtual force, a plurality of mobile robots and a plurality of fixed landmarks that are in a region, the fixed landmarks each having a demand for a number of robots, the system comprising:
initially dropping the plurality of mobile robots at respective initial points in the region;
using virtual force, moving one or more of the plurality of mobile robots to a new position over the region, wherein, prior to each move, each mobile robot of the one or more mobile robots remains in a current position for a predetermined period to collect messages from other mobile robots or one or more of the fixed landmarks, wherein each of the plurality of mobile robots is either an associated mobile robot that is associated with one of the fixed landmarks or an unassociated mobile robot that is not associated with one of the fixed landmarks;
for each unassociated mobile robot:
for the messages collected from the one or more mobile robots that are not associated with any fixed landmarks, the unassociated mobile robot computes either an attractive force or a repulsive force depending on a distance from the unassociated mobile robot to a source robot, wherein the attractive force is a virtual force that attracts the unassociated mobile robot toward the source robot and the repulsive force is a virtual force that repels the unassociated mobile robot away from the source robot;
for the messages collected from one or more of the fixed landmarks or other ones of the one or more mobile robots that are already associated, the fixed landmarks or other associated mobile robots collaborate with other fixed landmarks whose demand has not been satisfied;
while remaining in the current position for the predetermined period, the unassociated mobile robot sends an association message to a nearest fixed landmark; the nearest fixed landmark replies with a confirmation message or a rejection message;
maintaining the unassociated mobile robot in the current position on receipt of a confirmation message, and remaining at the current positions until the unassociated mobile robot determines that no neighboring fixed landmarks have a demand or the predetermined period elapses;
when the unassociated mobile robot receives a rejection message, the unassociated mobile robot contacts a next fixed landmark in a list of fixed landmarks; and
when the unassociated mobile robot fails to associate to any unsatisfied fixed landmark, the unassociated mobile robot proceeds by computing a composite virtual force, wherein when neighboring mobile robots are not associated with any fixed landmark, the unassociated mobile robot moves based on the composite virtual force with respect to the neighboring robots,
wherein the plurality of mobile robots is deployed until the demand for the number of robots of each fixed landmark is satisfied.

12. The system of claim 11, wherein the region is a two-dimensional plane and the plurality of mobile robots are operable to move in the two-dimensional plane.

13. The system of claim 11, wherein the region is a volume and the plurality of mobile robots are operable to move in three-dimensions.

14. The system of claim 11, wherein the composite virtual force is a total of force applied on the unassociated mobile robot from neighboring robots and repulsive force applied on the unassociated mobile robot from neighboring fixed landmarks.

15. The system of claim 14, wherein when neighboring mobile robots are not associated with any fixed landmark, the composite virtual force is determined as a virtual force in which force applied on the unassociated mobile robot from neighboring mobile robots is an attractive force or a repulsive force, wherein when the collected messages come from associated mobile robots or from satisfied fixed landmarks, the composite virtual force is a repulsive force.

16. The system of claim 11, wherein the collaboration with other fixed landmarks whose demand has not been satisfied includes:
- for each fixed landmark whose demand has not been satisfied, if the distance to the fixed landmark whose demand has not been satisfied is greater than zero, the message will be a demand message of that fixed landmark;
- if the distance to the fixed landmark whose demand has not been satisfied is zero and the distance to neighboring fixed landmarks is greater than zero, the message will include a list of neighboring fixed landmarks and their demands;
- otherwise, the message will be a repulsive force;
- for each mobile robot, if the distance to a given fixed landmark is greater than zero, the message will be a demand message on behalf of the given fixed landmark; and
- if the distance to neighboring fixed landmarks of the given fixed landmark is greater than zero, then the mobile robot will reply with a list of neighboring fixed landmarks and their demands,
- otherwise, the mobile robot will exert a repulsive force.

17. The system of claim 11, wherein the plurality of mobile robots stores current position information and history of visited fixed landmarks; and wherein:
- when a mobile robot fails to associate with an unsatisfied fixed landmark and the following conditions are satisfied: 1) there is no force applied on the mobile robot for a plurality of iterations, and 2) the only force exerted toward the mobile robot is a repulsive force for the plurality of iterations, then the mobile robot performs a Trace Fingerprint operation to cause the mobile robot to perform operations, including:
- dividing the region into squares and determining a coverage of each square based on a history of visited fixed landmarks;
- moving toward a nearest unvisited fixed landmark; and
- repeating the determining of a coverage region and moving toward the nearest unvisited fixed landmark until the mobile robot gets within a predefined range of a demanding fixed landmark and associates with the demanding fixed landmark.

18. The system of claim 11, wherein there are three or more fixed landmarks to cover the region.

19. The system of claim 11, wherein locations of the fixed landmarks are predetermined.

20. The system of claim 11, wherein each fixed landmark requests the number of robots depending on a demand for services in the region.

* * * * *